(12) United States Patent
Srinivasa et al.

(10) Patent No.: US 8,390,500 B1
(45) Date of Patent: Mar. 5, 2013

(54) ASYNCHRONOUS PULSE PROCESSING APPARATUS AND METHOD PROVIDING SIGNAL REVERBERATION

(75) Inventors: Narayan Srinivasa, Oak Park, CA (US); Jose Cruz-Albrecht, Oak Park, CA (US); Peter Petre, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 347 days.

(21) Appl. No.: 12/815,366

(22) Filed: Jun. 14, 2010

(51) Int. Cl.
*H03M 1/38* (2006.01)

(52) U.S. Cl. ........ 341/161; 382/103; 375/211; 375/242; 455/344; 370/212

(58) Field of Classification Search .......... 341/143–166; 382/103; 375/211, 242; 455/344; 370/212
See application file for complete search history.

(56) References Cited

U.S. PATENT DOCUMENTS

| | | | |
|---|---|---|---|
| 5,345,398 A | | 9/1994 | Lippmann et al. |
| 5,479,170 A | | 12/1995 | Cauwenberghs et al. |
| 5,894,280 A | | 4/1999 | Ginetti et al. |
| 6,452,524 B1 | | 9/2002 | Fraleigh et al. |
| 6,473,019 B1 | | 10/2002 | Ruha et al. |
| 6,975,682 B2 | | 12/2005 | Cosand |
| 7,038,608 B1 | | 5/2006 | Gilbert |
| 7,403,144 B1 | | 7/2008 | Cruz-Albrecht et al. |
| 7,405,686 B2 | | 7/2008 | Laroia et al. |
| 7,515,084 B1 | | 4/2009 | Cruz-Albrecht et al. |
| 7,592,939 B1 | | 9/2009 | Cruz-Albrecht et al. |
| 7,724,168 B1 | | 5/2010 | Cruz-Albrecht et al. |
| 7,750,835 B1 * | | 7/2010 | Cruz-Albrecht et al. ..... 341/166 |
| 7,948,869 B2 * | | 5/2011 | Petre et al. .................... 370/212 |
| 7,965,216 B1 * | | 6/2011 | Petre et al. .................... 341/155 |
| 8,040,265 B2 * | | 10/2011 | Cruz-Albrecht et al. ..... 341/143 |
| 8,174,425 B1 * | | 5/2012 | Srinivasa et al. .............. 341/166 |

OTHER PUBLICATIONS

J. M. Cruz et al., "A 16 c 16 Cellular Neural Network Universal Chip: The First Complete Single-Chip Dynamic Computer Array with Distributed Memory and with Gray-Scale Input-Output," Analog Integrated Circuits and Signal Processing, vol. 15, 1998, pp. 227-237.
A. A. Lazar et al., "Perfect Recovery and Sensitivity Analysis of Time Encoded Bandlimited Signals," IEEE Trans on Circuits and Systems-I: Regular Papers, vol. 51, No. 10, Oct. 2004, pp. 2060-2073.
A. M. Dighe et al., "An Asynchronous Serial Flash Converter," 9th Int. Conf. on Electronics, Circuits and Systems, IEEE, 2002, pp. 13-15.
D. Donoho, "Compressed Sensing," IEEE Trans. on Information Theory, vol. 42, No. 4, Apr. 2006, pp. 1289-1306.

(Continued)

*Primary Examiner* — Lam T Mai
(74) *Attorney, Agent, or Firm* — North Shore Associates

(57) ABSTRACT

An asynchronous pulse processing (APP) apparatus, APP system and a method of signal reverberation employ asynchronous pulse processing to provide signal reverberation. The APP apparatus includes a gain block configured to scale an input signal by a first scale value and a summation block configured to produce a composite signal. The composite signal represents the scaled input signal minus an input summation signal multiplied by a reverberation signal, minus the reverberation signal scaled by a second scale value, and plus a function-modified feedback signal. The APP apparatus further includes an integrator and a time encoder configured to produce the reverberation signal from the composite signal. The APP system includes a plurality of APP apparatuses as APP channels. The method of signal reverberation includes generating a composite signal from a scaled input signal, and integrating and time encoding the composite signal to produce a reverberation signal.

20 Claims, 3 Drawing Sheets

OTHER PUBLICATIONS

M. Iwamoto et al., "Bandpass Delta-Sigma Class-S Amplifier," Electronics Letters, vol. 36, No. 12, Jun. 2000, pp. 1010-1012.

J. Keane et al., "Impulses and Stochastic Arithmetic for Signal Processing," Proc. 2001 IEEE Int. Conf. on Acoustics, Speech and Signal Processing, 2001, pp. 1257-1260.

E. Roza, "Analog to Digital Conversion via Duty Cycle Modulation," IEEE Trans. on Circuits and Systems-II, vol. 44, No. 11, 1997, pp. 907-914.

R. Walden, "Analog to Digital Converter Survey and Analysis," IEEE J. on Selected Areas in Communications, vol. 17, No. 4, Apr. 1999, pp. 539-550.

Y. Xia et al., "A Recurrent Neural Network for Solving Nonlinear Convex Programs Subject to Linear Constraints," IEEE Trans. on Neural Networks, vol. 16, No. 2, Mar. 2005, pp. 379-386.

S. Funahashi et al., "Prefrontal Neuronal Activity in Rhesus Monkeys Performing a Delayed Anti-Saccade Task," Nature, vol. 365, No. 21, Oct. 1993, pp. 753-756.

J. J. Hopfield, "Neural networks and physical systems with emergent collective computational abilities," Proc., Natl. Acad. Sci., vol. 79, Apr. 1982, pp. 2554-2558.

S. Grossberg, "Why to Cells Compete? Some Examples from Visual Perception," UMAP Journal, vol. III, No. 1, 1982, pp. 103-121.

Cohen et al., "Absolute Stability of Global Pattern Formation and Parallel Memory Storage by Competitive Neural Networks," IEEE Trans. on Systems, Man, and Cybernetics, vol. SMC-13, No. 5, Sep./Oct. 1983, pp. 815-826.

J. M. Fuster, "Unit activity in the prefrontal cortex during delayed response performance: neuronal correlates of transient memory," Journal of Neurophysiology, vol. 36, 1973, pp. 61-78.

A. A. Lazar et al., "Perfect Recovery and Sensitivity Analysis of Time Encoded Bandlimited Signals," BNET Technical Report #1-03, Department of Electrical Engineering, Columbia University, New York, NY, Sep. 2003, pp. 1-30.

* cited by examiner

ASYNCHRONOUS PULSE PROCESSING APPARATUS AND METHOD PROVIDING SIGNAL REVERBERATION

CROSS-REFERENCE TO RELATED APPLICATIONS

N/A

STATEMENT REGARDING FEDERALLY SPONSORED RESEARCH OR DEVELOPMENT

N/A

BACKGROUND

1. Technical Field

The invention relates to analog circuits and systems. In particular, the invention relates to encoding and processing a plurality of input signals.

2. Description of Related Art

Multi-channel systems used in various modern processing and control applications are becoming more and more commonplace and important. For example, processing signals from a large array of sensors (e.g., a focal plane array of optical sensors) almost always involves simultaneous or nearly simultaneous processing of multiple, parallel channels from the sensor array. However, while important for many real world, modern applications, such multi-channel systems often present significant design challenges including, but not limited to, providing simultaneous processing capability for a plurality of wide dynamic range signals on the multiple, adjacent channels present in such systems. Problems including, but not limited to, the so-called noise-saturation dilemma, in which a large signal on one channel interferes with processing of small, effectively noise-like signals in adjacent channels, generally must be addressed in the design of the multi-channel system. Neuromorphic circuits and related circuit topologies may offer a solution to some of these significant obstacles associated with the design of multi-channel systems.

Neuromorphic circuits are electronic circuits that mimic the operation of cell populations within a nervous system and as such, may offer a number of advantages for robust signal processing in support of various multi-channel control and sensor processing applications. In particular, neuromorphic circuits may facilitate robust multi-channel signal processing in a manner that mimics certain populations of neural cells including, but not limited to, populations of neural cells found in an animal's brain, for example. As an animal's brain is generally adept at processing and interpreting a barrage of signals received from an animal's environment in a robust manner, so too are various neuromorphic circuits that mimic brain-like functions. Specifically, the neuromorphic circuit may perform various brain-like functions in a robust manner substantially similar to, or at least modeled on, its biological counterpart. An example of a neuromorphic circuit topology that offers some significant promise is the feed-forward, on-center off-surround network. The challenge remains in developing practical implementations and more particularly, low-power integrated circuit implementations, for multi-channel control and processing systems that facilitate using neuromorphic circuits such as the feed-forward, on-center off-surround network topology.

BRIEF DESCRIPTION OF THE DRAWINGS

The various features of embodiments of the present invention may be more readily understood with reference to the following detailed description taken in conjunction with the accompanying drawings, where like reference numerals designate like structural elements, and in which.

DETAILED DESCRIPTION

Figure 1:
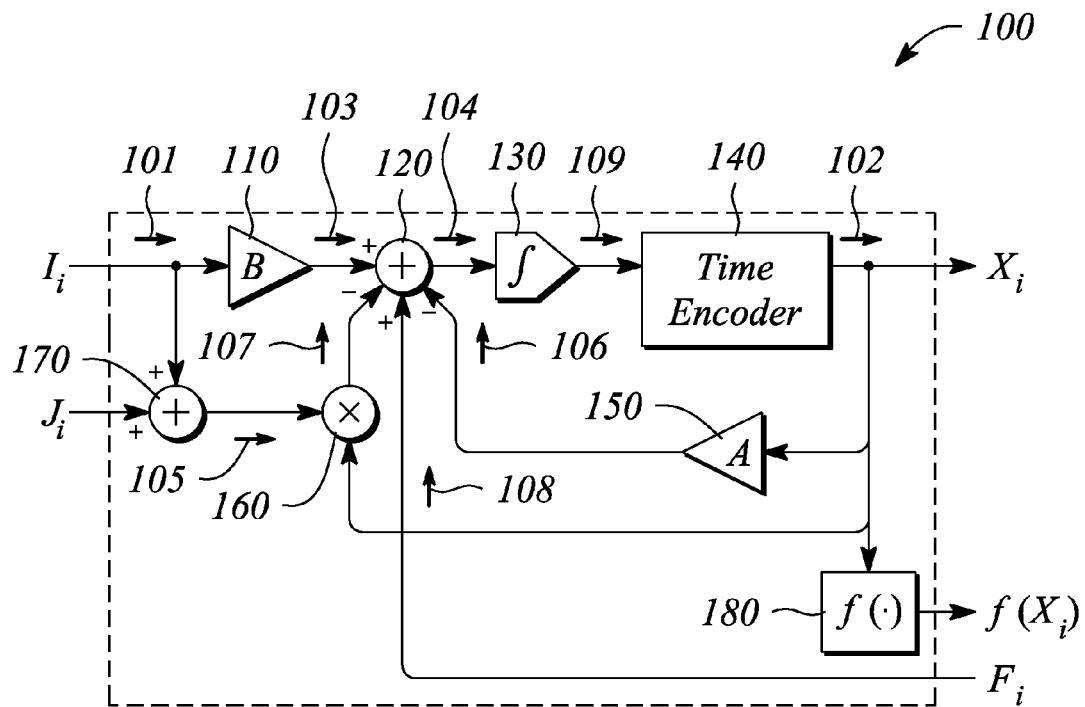
FIG. 1 illustrates a block diagram of an asynchronous pulse processing (APP) apparatus, according to an embodiment of the present invention.

Embodiments of the present invention provide signal reverberation that facilitates processing of a plurality of signals, especially signals from an ensemble source. In particular, embodiments of the present invention employ asynchronous pulse processing (APP) circuits to implement and provide signal reverberation of signals from a plurality of sources or input channels (e.g., an array of sensors). The provided signal reverberation allows a particular signal to reverberate or 'stay alive' for some time in the presence of other, potentially disrupting signal activity from the ensemble source. Some embodiments of the present invention implement signal reverberation based on a feed-forward on-center off-surround network model of neural cellular interactions associated with some forms of memory in animals. The feed-forward on-center off-surround network may permit effective processing of arbitrary input patterns across multiple input channels when providing signal reverberation. Further, some embodiments of the present invention may be realized using inherently low-power circuits or equivalent implementations using asynchronous pulse processing.

In some embodiments, the feed-forward on-center off-surround network may model, or be based on, neural cellular interactions. In particular, a feed-forward on-center off-surround network model for producing a reverberation signal may be given by equation (1) as $$\frac{dX_i}{dt} = -AX_i + (B - X_i)[f(X_i) + I_i] - X_i\left(\sum_{k \neq i}^{n} f(X_k) + J_i\right) \quad (1)$$

where $X_i$ represents a reverberation signal output by an i-th channel of the network, $I_i$ represents an i-th channel-specific input signal, $J_i$ represents a reverberation inhibition signal of the i-th channel of the network, and where $X_k$ represents reverberation signals output by a plurality of other channels of the network, indexed on an integer k, k being not equal to i, and $f(\bullet)$ is the a function that modifies a respective reverberation signal $X_i$ and $X_k$. The plurality of reverberation signals $X_k$ includes a number n of signals, where n is an integer larger than one and representing a number of channels of the network. Further, by definition, the i-th channel of the network as well as the other channels are all explicitly recognized as channels of the network (i.e., i, k∈j where $1 \leq j \leq n$). In some embodiments, values of the variables A and B are selected such that the variable B is greater than A (i.e., B>A). Further, the variables A and B in equation (1) are scale values of the feed-forward on-center off-surround network that provide for control of a performance of the network. Equation (1) is further discussed by M. A. Cohen and S. Grossberg, "Absolute stability of global pattern formation and parallel memory storage by competitive neural networks," IEEE Trans on Systems, Man, and Cybernetics, SMC-13, 1983, pp. 815-826, incorporated herein by reference.

Embodiments of the present invention employ time encoding as part of asynchronous pulse processing in providing signal reverberation. Time encoding, as defined herein, effectively encodes a continuous amplitude variation in an analog signal as an asynchronous pulse sequence wherein one or both of a width and a position of pulses within the pulse sequence represents an amplitude variation of the analog signal. In effect, the time encoding transforms the analog signal from a continuous amplitude, continuous time, analog domain to a time-encoded domain. The time-encoding transformation further facilitates time-encoded domain-based processing of the signal. Time-encoding is an alternative to classical analog-to-digital sampling methods in that time-encoding offers an approach to real-time asynchronous encoding of time-varying signal amplitude information as a time sequence of pulses. More information about time encoding and time encoders that provide time-encoding as employed herein is provided by Cruz-Albrecht et al., U.S. Pat. No. 7,403,144 B1, incorporated by reference in its entirety herein.

Herein, 'scaling' a signal is defined as multiplying the signal by a scalar value. Scaling generally affects a magnitude of the signal. For example, scaling a signal S by an arbitrary value P, with P being a scalar value, is equivalent to forming a multiplicative product P·S. Scaling may be provided by a gain block, according to some embodiments. An amplifier with a specified gain or gain value is an example of a gain block.

Further herein, a multiplier or a multiplier block is used to multiply a first signal $S_1$ by a second signal $S_2$. In contrast to scaling, herein multiplying using a multiplier may affect both a magnitude and a frequency of a resultant signal when compared to the magnitudes and frequencies of the first and second signals $S_1$, $S_2$. A Gilbert multiplier comprising a differential pair of transistors is an example of an implementation of a multiplier.

Also herein, a 'signal' is defined as a time varying quantity. Thus, a signal may be generally represented by a function of time t as S(t). However, in general herein, signals are represented without explicit reference to time for simplicity of notation and not by way of limitation. For example, the signal S(t) may be denoted or represented simply as 'S'.

Embodiments of the present invention may be implemented using a variety of means including, but not limited to, integrated circuits (ICs), very large scale integrated (VLSI) circuits, application specific integrated circuits (ASIC), software and firmware. For example, elements or 'blocks' of an apparatus of the present invention may all be implemented as circuit elements within an ASIC or a VLSI circuit. In another example, the entire apparatus may be implemented as software using a computer programming language (e.g., C/C++) or software-based modeling environment (e.g., Matlab). In yet another example, some of the blocks may be implemented using actual circuitry (e.g., as an IC or an ASIC) while other blocks may be implemented in software or firmware.

As used herein, the article 'a' is intended to have its ordinary meaning in the patent arts, namely 'one or more'. For example, 'a channel' generally means 'one or more channels' and as such, 'the channel' means 'the channel(s)' herein. Herein, the term 'about' when applied to a value generally means plus or minus 10% unless otherwise expressly specified. Also, any reference herein to 'top', 'bottom', 'upper', 'lower', 'up', 'down', 'left' or 'right' is not intended to be a limitation herein. Moreover, examples herein are intended to be illustrative only and are presented for discussion purposes and not by way of limitation.

FIG. 1 illustrates a block diagram of an asynchronous pulse processing (APP) apparatus 100, according to an embodiment of the present invention. The APP apparatus 100 receives an input signal 101 that is one of a plurality of input signals. The APP apparatus 100 processes the input signal 101 using information provided, in part, by other ones of the input signals of the plurality. As illustrated in FIG. 1, the APP apparatus 100 processes pulse-based or time-encoded input signals as opposed to analog input signals (i.e., the input signal 101 comprises a time-encoded input signal). The APP apparatus 100 produces a reverberation signal 102 as an output. As such, the APP apparatus 100 also may be referred to as a reverberation apparatus. In some embodiments, the APP apparatus 100 implements signal normalization based on a model of feed-forward on-center off-surround neural cellular interactions.

The APP apparatus 100 comprises a gain block 110. The gain block 110 is configured to scale the input signal 101 by a first scale value. The gain block 110 produces a scaled input signal 103 from the input signal 101. For example, when the first scale value is a scalar value B and the input signal 101 is represented by $I_i$ (as illustrated in FIG. 1) where i is an integer, the scaled input signal 103 may be given by $B \cdot I_i$. In some embodiments, the gain block 110 comprises an amplifier with gain given by the first scale value. For example, the gain block 110 may comprise a transconductance amplifier with a gain equal to the first scale value. The gain block 110 also may be referred to herein as the 'apparatus gain block' 110 to distinguish from subsequently described gain blocks.

The APP apparatus 100 further comprises a summation block 120. The summation block 120, also sometimes called an adder, is configured to produce a composite signal 104. The composite signal 104 represents the scaled input signal plus a function-modified feedback signal 108 (i.e., also illustrated as $F_i$), minus an input summation signal 105 multiplied by the reverberation signal 102, and further minus the reverberation signal 102 scaled by a second scale value. The reverberation signal 102 when scaled by the second scale value is referred to as a scaled reverberation signal 106, while the input summation signal 105 when multiplied by the reverberation signal 102 is referred to as a multiplied summation signal 107. Each of the second scale value, the input summation signal 105 and the function-modified feedback signal 108, are further described below. As illustrated in FIG. 1, the summation block 120 comprises two plus inputs (labeled '+') and two minus inputs (labeled '−') as well as an output. The scaled input signal 103 is applied to a first one of the two plus (+) inputs. The composite signal 104 exits the summation block 120 at the output, as illustrated in FIG. 1.

The composite signal 104 may be produced within the summation block 120 by subtracting from the scaled input signal 103 the scaled reverberation signal 106 and the multiplied summation signal 107 while adding the function-modified feedback signal 108. In some embodiments, the summation block 120 is implemented using wire merging and electric current summation. The summation block 120 also may be referred to herein as the 'apparatus summation block' 120 to distinguish from subsequently described summation blocks.

In some embodiments, the second scale value is denoted by a value A. In these embodiments, if the reverberation signal 102 is represented by $X_i$, then the scaled reverberation signal 106 may be represented by $A \cdot X_i$. The scaled reverberation signal 106 is communicated to a first one of the minus (−) inputs of the summation block 120, as illustrated in FIG. 1.

The input summation signal 105 represents a summation of the input signal 101 and a reverberation inhibition signal. The reverberation inhibition signal provides control of an amount of reverberation in the reverberation signal 102. For example, if the input signal is represented by $I_i$ and the reverberation inhibition signal is represented by $J_i$, then the input summation signal 105 may be represented by $(I_i+J_i)$. In some embodiments, the input signal $I_i$ and the reverberation inhibition signal $J_i$ are selected from a plurality of pairs of input and reverberation inhibition signals indexed on i, wherein i is an integer between 1 and n. A number n of inputs signals in the plurality may be very large (e.g., n=10,000 or more), according to various embodiments. With this notation, the multiplied summation signal 107 may be denoted as a multiplicative product $X_i \cdot (I_i+J_i)$. The multiplied summation signal 107 is communicated to a second one of the minus (−) inputs of the summation block 120, as illustrated in FIG. 1.

In some embodiments, the function-modified feedback signal 108 comprises the reverberation signal 102 modified by a function and scaled by the first value minus the reverberation signal 102 multiplied by a summation of the function-modified reverberation signal and a plurality of function-modified reverberation signals of other APP apparatuses. For example, if the function is represented by $f(\bullet)$ and using the notation introduced above with the first scale value represented by B and the reverberation signal 102 represented by $X_i$, a scaled function-modified reverberation signal of the function-modified feedback signal 108 may be represented by $B \cdot f(X_i)$. Using similar notation, the function-modified reverberation signals, including the function-modified reverberation signal $f(X_i)$ and the plurality of function-modified reverberation signals of the other APP apparatuses, may be represented by $f(X_k)$, wherein k ranges from 1 to n. With this notation, the multiplicative product of the reverberation signal 102 represented by $X_i$ and the above-referenced summation may be represented by $$X_i \sum_{k=1}^{n} f(X_k), i \in k$$

or simply $X_i \cdot \Sigma f(X)$. Then, the function-modified feedback signal 108 may be given by simply $F_i=B \cdot f(X_i)-X_i \Sigma f(X)$, for example. The function-modified feedback signal 108 is communicated and applied to a second one of the plus (+) inputs of the summation block 120, as illustrated.

The APP apparatus 100 further comprises an integrator 130. The integrator 130 is configured to integrate the composite signal 104 and produce an integrated signal 109. The integrated signal 109 produced by the integrator 130 represents a time integral of the composite signal 104. The integrator 130 may be implemented as any one or more of a number of known integrator circuits, for example. The integrator 130 also may be referred to herein as the 'apparatus integrator' 130 to distinguish from subsequently described integrators herein.

The APP apparatus 100 further comprises a time encoder 140. The time encoder 140 is configured to time-encode the integrated signal 109 and produce the reverberation signal 102. In some embodiments, the time encoder 140 provides asynchronous pulse-based encoding (i.e., time encoding) of a signal at an input of the time encoder 140.

Figure 2:
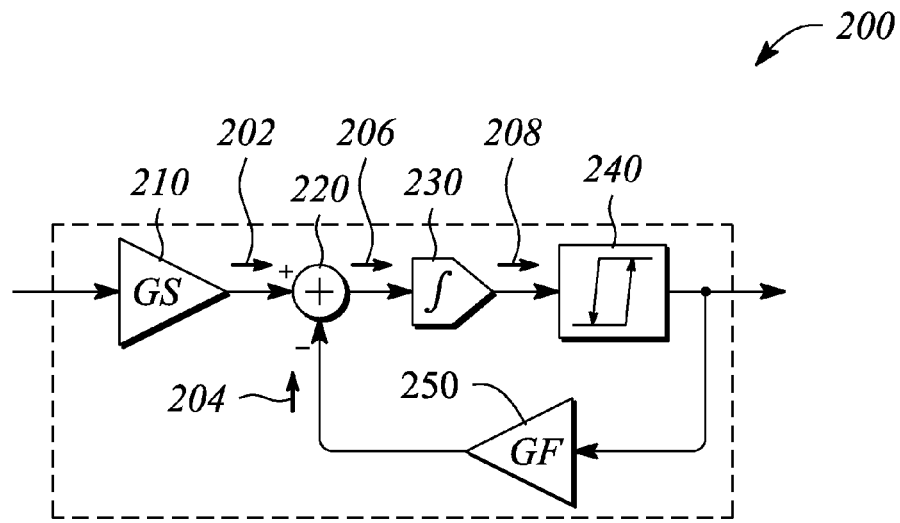
FIG. 2 illustrates a block diagram of a time encoder, according to an embodiment of the present invention.

FIG. 2 illustrates a block diagram of a time encoder 200, according to an embodiment of the present invention. The time encoder 200 may be used as the time encoder 140 of the APP apparatus 100, for example. As illustrated, the time encoder 200 comprises an input gain block 210. An input of the input gain block 210 is connected to or effectively is an input of the time encoder 200. The input gain block 210 is configured to receive and scale a signal present at the input of the time encoder 200 (e.g., the integrated signal 109). The input gain block 210 produces a scaled signal 202, as illustrated. In some embodiments, the input gain block 210 scales the signal present at the input of the time encoder 200 by a gain scale value GS. In some embodiments, the input gain block 210 comprises a transconductance amplifier having a gain value equal to the gain scale value (e.g., GS), as illustrated in FIG. 2. The input gain block 210 also is referred to as the 'TE gain block' 210 to distinguish from other described gain blocks herein.

The time encoder 200 illustrated in FIG. 2 further comprises a summation block 220. A plus (+) input of the summation block 220 is connected to an output of the input gain block 210. The summation block 220 is configured to subtract a feedback signal 204 from the scaled signal 202. The summation block 220 produces a difference signal 206. The summation block 220 also is referred to as the 'TE summation block' 220 to distinguish from other described summation blocks herein.

The time encoder 200 further comprises an integrator 230. An input of the integrator 230 is connected to an output of the summation block 220. The integrator 230 is configured to integrate the difference signal 206 output by the summation block 220. The integrator 230 produces an integrated difference signal 208 representing a time integral of the difference signal 206. The integrator 230 also is referred to as the 'TE integrator' 230 to distinguish from other described integrators herein.

The time encoder 200 further comprises a Schmidt trigger 240. An input of the Schmidt trigger 240 is connected to an output of the integrator 230. The Schmidt trigger 240 is configured to receive the integrated difference signal 208 output by the integrator 230 and to produce an output signal of the time encoder 200 (e.g., the reverberation signal 102 illustrated in FIG. 1). The Schmidt trigger 240 acts as a hysteresis quantizer to threshold the signal produced by the integrator 230. The output signal produced by the Schmidt trigger 240 exits the time encoder 200 at an output of time encoder 200. While described herein specifically as a Schmidt trigger 240, the hysteresis quantizer functionality may be provided by other thresholding circuits that provide hysteresis quantizing and still be within the scope of the present invention.

As illustrated in FIG. 2, the time encoder 200 further comprises a feedback gain block 250. The feedback gain block 250 is connected between an output of the Schmidt trigger 240 (or equivalently the output of the time encoder 200) and a minus (−) input of the summation block 220. The feedback gain block 250 is configured to scale the Schmidt trigger output signal by a feedback scale value to produce the feedback signal 204. In some embodiments, the feedback scale value of the feedback gain block 250 is represented by a value GF. The feedback signal 204 is used by the summation block 220, as described above. The feedback gain block 250 also is referred to as the 'TE feedback gain block' 250 to distinguish from other described feedback gain blocks herein.

Referring again to FIG. 1, in some embodiments, the APP apparatus 100 further comprises a feedback gain block 150 configured to provide the scaled reverberation signal 106. The feedback gain block 150 has a scale or gain value equal to the second scale value (e.g., the value A). The feedback gain block 150 is connected between an output of the time encoder 140 and the first one of the two minus (−) inputs of the summation block 120, as illustrated. The feedback gain block 150 is configured to accept the reverberation signal 102 and output the scaled reverberation signal 106. The feedback gain block 150 may comprise a transconductance amplifier with a gain equal to the second scale value, for example. The feedback gain block 150 also is referred to as the 'apparatus feedback gain block' 150 to distinguish from other described feedback gain blocks herein.

In some embodiments, the APP apparatus 100 further comprises a multiplier 160. The multiplier 160 is connected between an output of the time encoder 140 and the second one of the minus (−) inputs of the summation block 120. The multiplier 160 multiplies the reverberation signal 102 by the summation signal 105 and provides the multiplicative product as the multiplied signal 107 to the second minus (−) input of the summation block 120. The multiplier 160 may comprise a Gilbert multiplier, for example.

In some embodiments, APP apparatus 100 further comprises an input summation block 170 configured to provide the input summation signal 105. The input summation block 170 accepts the input signal 101 and adds it to reverberation inhibition signal (e.g., $I_i+J_i$) to generate the input summation signal 105. In some embodiments, the input summation block 170 is implemented using wire merging and electric current summation. An output of the input summation block 170 is connected to the multiplier 160, as illustrated in FIG. 1.

In some embodiments, the function $f(\bullet)$ that modifies the reverberation signal 102 is provided by a function block 180, as illustrated in FIG. 1. The function block 180 comprises a circuit or equivalent element, including but not limited to a software or firmware program, that implements modification of the reverberation signal 102. As illustrated, the function block 180 is connected to the output of the time encoder 140. An output of the function block 180 is the function-modified reverberation signal $f(X_k)$.

In various embodiments, the function $f(\bullet)$ may be or may represent any one or more of several function types including, but not limited to, functions that are slower than linear, functions that are linear, functions that are faster than linear and functions that are faster than linear but that generally level off to linear (i.e., Faster than Linear—level Off to Linear or 'FLOL'). With functions that are either slower than linear or linear, the APP apparatus 100 may exhibit noise amplification. In the case of slower than linear function types, a pattern at reverberation may be value independent of initial activities while the pattern at reverberation may have relative activities preserved for linear-type functions. On the other hand, faster than linear functions and FLOL-type functions may substantially quench noise. Faster than linear functions may exhibit maximal compression of the pattern at reverberation. FLOL-type functions may provide contrast enhancement and substantially preserve the pattern at reverberation.

In some embodiments, the function $f(\bullet)$ comprises a sigmoid function. The sigmoid function produces similar results to that of an FLOL-type function, according to some embodiments. When the function $f(\bullet)$ comprises the sigmoid function, the function block 180 may comprise a sigmoid block 180 and the function-modified reverberation signal $f(X_i)$ may be provided by the sigmoid block 180. In particular, the sigmoid block 180 may be connected to the output of the time encoder 140, for example. The sigmoid block 180 accepts the reverberation signal 102 from the output of the time encoder 140. The sigmoid block 180 modifies the reverberation signal 102 according to the sigmoid function to produce the function-modified reverberation signal $f(X_i)$.

In some embodiments, the function-modified reverberation signal $f(X_i)$ is provided by elements or circuits external to the APP apparatus 100. In other words, a means for providing the function-modified reverberation signal $f(X)$ may be employed, in some embodiments. In particular, in some embodiments, the function-modified reverberation signal $f(X_i)$ may be provided to a gain block (not illustrated) having the first scale value (e.g., B) to generate the scaled function-modified reverberation signal (e.g., $B \cdot f(X_i)$). In some embodiments, the function-modified reverberation signal $f(X_i)$ is further may be provided to a summation block (not illustrated) external to APP apparatus 100. The external summation block produces a summation of the function-modified reverberation signal $f(X_i)$ and the function-modified reverberation signals of the other APP apparatuses (e.g. $\Sigma f(X)$). In some embodiments, the external summation block is implemented using wire merging and electric current summation. The function-modified feedback signal 108 may be generated by multiplying a result of the summation by the reverberation signal 102 using a multiplier (not illustrated) and subtracting the product (e.g., $X_i \Sigma f(X)$) from the scaled function-modified reverberation signal (e.g., $B \cdot f(X_i)$) using yet another summation block (not illustrated), for example.

It should be noted that there may be other embodiments (not illustrated) that produce the composite signal 104 in a manner other than that described above and illustrated in FIG. 1. All such other embodiments are explicitly included within the scope of the present invention, unless otherwise noted. In particular, in describing the composite signal 104, it is explicitly meant that the composite signal 104 may be effectively any signal that is equivalent to the specific signal or combination of signals and scale values described above. That is, there may be other combinations of the reverberations signal 102, the first and second scale values, the input summation signal 105, the reverberation inhibition signal $J_i$, the function-modified reverberation signal, and the summation of the function-modified reverberation signal that are mathematically equivalent to that described above. These other combination may be readily identified by a mathematical rearrangement (e.g., one or both of expanding and regrouping) of terms in equation (1). Implementations that produce the composite signal 104 according to those other combinations are within the scope of the present invention.

For example, according to one alternative exemplary implementation, the function-modified reverberation signal represented as $f(X_i)$ may be added to the input signal 101 represented as prior to scaling by the first scale value (e.g., B) in the gain block 110. An output of the gain block 110 would then provide both the scaled input signal 103 represented by $B \cdot I_i$ and the scaled function-modified reverberation signal portion of the function-modified feedback signal 108 represented by $B \cdot f(X_i)$ (e.g., scaling $I_i + f(X_i)$ by B produces $B \cdot I_i + B \cdot f(X_i)$). In such an implementation, the function-modified feedback signal 108 may not exist as an explicit signal but instead is virtually present in the composite signal 104, for example. Similarly, adding the function-modified reverberation signal summation represented by $\Sigma f(X)$ to the input summation signal 105 facilitates generation of the product $X_i \Sigma f(X)$ using the multiplier 160 as part of the multiplied summation signal 107. Providing the product $X_i \Sigma f(X)$ by separately generating it as part of an explicit function-modified feedback signal 108 may be obviated as a result. However, while the product $X_i \cdot \Sigma f(X)$ may not be explicitly recognized as a part of an actual function-modified feedback signal 108, the product $X_i \cdot \Sigma f(X)$ is still present in the composite signal 104. As such, the function-modified feedback signal 108 (i.e., a portion thereof associated with the product $X_i \Sigma f(X)$) is still virtually present in the composite signal 104 according to such an implementation.

Figure 3:
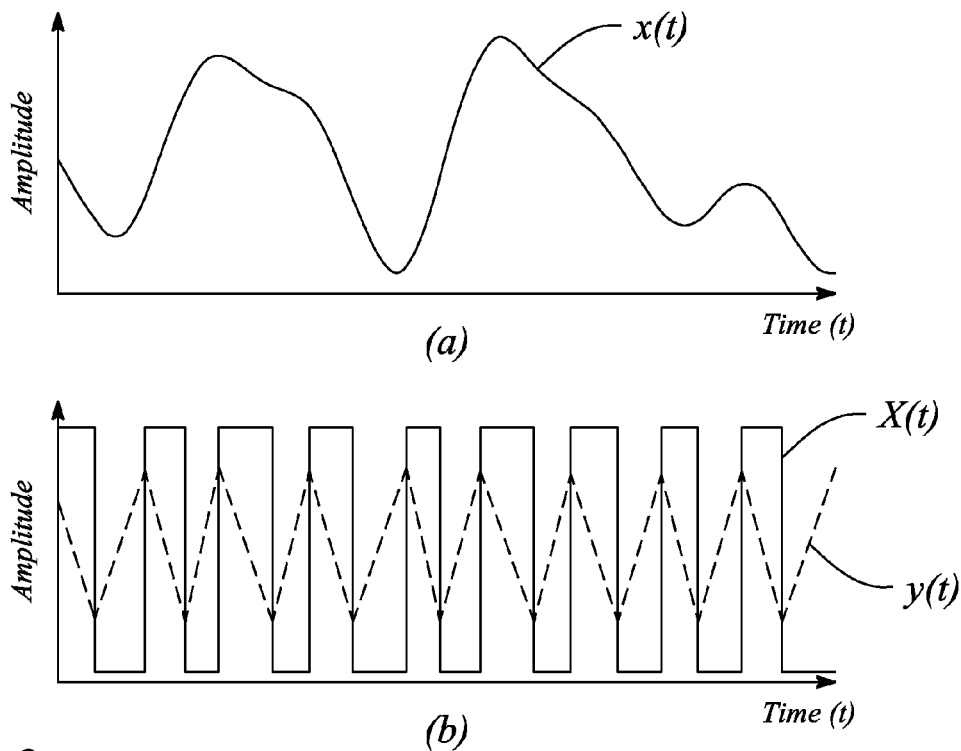
FIG. 3 illustrates a graphical example of time encoding using a time encoder, according to an embodiment of the present invention.

FIG. 3 illustrates a graphical example of time encoding using a time encoder, according to an embodiment of the present invention. The time encoder may be the time encoder 140 illustrated in FIG. 1 or the time encoder 200 illustrated in FIG. 2, for example. As illustrated, an upper graph (a) illustrates a plot of an exemplary analog signal x(t) as a function of time t. A lower graph (b) of FIG. 3 illustrates a signal y(t) as a dashed line representing a signal produced by an integrator, for example the integrator 230 and the integrated difference signal 208 of FIG. 2. Another curve (solid line) in the lower graph (b) of FIG. 3 illustrates a signal X(t) that represents a signal output by a thresholding circuit that provides hysteresis-quantizing functionality, for example the Schmidt trigger 240 of FIG. 2. As illustrated, the signal X(t) time-encodes the amplitude variation of the exemplary analog signal x(t), depicted as pulses of varying widths in FIG. 3.

Figure 4:
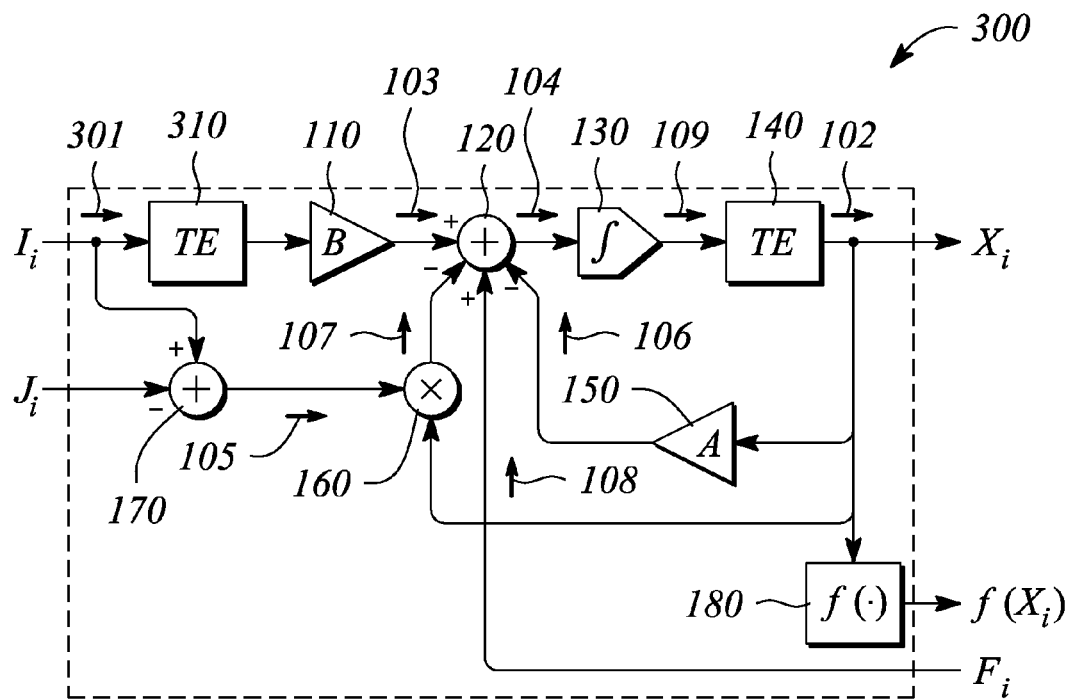
FIG. 4 illustrates a block diagram of an asynchronous pulse processing (APP) apparatus, according to another embodiment of the present invention.

FIG. 4 illustrates a block diagram of an asynchronous pulse processing (APP) apparatus 300, according to another embodiment of the present invention. As illustrated, the APP apparatus 300 is configured to receive and process an analog signal as an input signal 301. In particular, the APP apparatus 300 differs from the APP apparatus 100 in that the APP apparatus 300 accepts an analog signal as the input signal 301 while the input signal 101 of the APP apparatus 10 is time-encoded. In some embodiments, the APP apparatus 300 implements signal reverberation based on a model of feed-forward on-center off-surround neural cellular interactions.

As illustrated in FIG. 4, in some embodiments, the APP apparatus 300 comprises the APP apparatus 100, described above. In particular, the APP apparatus 300 comprises each of the gain block 110, the summation block 120, the integrator 130, the time encoder (TE) 140, the feedback gain block 150, and the multiplier 160, the input summation block 170, and the function block 180, as described above with respect to the APP apparatus 100. Moreover, the various elements of the APP apparatus 100 within the APP apparatus 300 one or both of produce and process the scaled signal 103, the composite signal 104, summation signal 105, the scaled reverberation signal 106, the multiplied signal 107, the function-modified feedback signal 108, and the integrated signal 109, as described above.

The APP apparatus 300 further comprises another time encoder (TE) 310 in addition to the time encoder 140 of the APP apparatus 100. In particular, the time encoder 310 is connected between an input of the APP apparatus 300 and an input of the APP apparatus 100, or equivalently the gain block 110 of the APP apparatus 100. The time encoder 310 is configured to time-encode the input signal 301 before the input signal 301 is received by the gain block 110. The additional time encoder 310 facilitates receiving and processing the analog input signal 301. The time encoder 310 is also referred to as the 'input time encoder' 310 to distinguish from other described time encoders herein.

In some embodiments, the time encoder 310 and the time encoder 140 differ from one another. For example, the time encoder 310 may have a different architecture than that of the time encoder 140. As such, the time encoder 310 may produce an asynchronous pulse sequence according to different criteria than is used by the time encoder 140, for example. In other embodiments, both the time encoder 310 and the time encoder 140 comprise a similar architecture (e.g., the architecture illustrated in FIG. 2) and produce similar asynchronous pulse sequences under similar signal conditions. However, respective ones of scale values of similar gain blocks within the two time encoders 310, 140 may differ or be independent of one another.

For example and referring to time encoder 200 of FIG. 2, both time encoders 310, 140 may comprise an input gain block 210 configured to scale a signal at the inputs of the time encoders 310, 140 by a respective scale value. The scale value of the input gain block 210 of the time encoder 140 may be represented by a value GS2 while the input gain block 210 of the other time encoder 310 may have a scale value represented by a value GS1, for example. In some embodiments, the value GS2 is not equal to (i.e., differs from) the value GS1. For example, the value GS1 may be equal to about 1800 while the value GS2 may be equal to about 1000. In other embodiments, the two values, GS2 and GS1, are about equal to one another.

Similarly, both of the time encoders 310, 140 may comprise a feedback gain block 250, as illustrated in FIG. 2. The scale value of the feedback gain block 250 of the time encoder 140 may be represented by a value GF2 while the feedback gain block 250 of the other time encoder 310 may have a scale value represented by a value GF1, for example. In some embodiments, the value GF2 is not equal to (i.e., differs from) the value GF1. For example, the value GF1 may be equal to about 1200 while the value GF2 may be equal to about 1000. In other embodiments, the two values, GF2 and GF1, are about equal to one another. In some embodiments, the values of GS1, GS2, GF1 and GF2 are selected to be between about 1000 and about 2000.

Continuing with reference to FIG. 2, both time encoders 310, 140 may further comprise the summation block 220 configured to subtract the feedback signal 204 from the scaled signal 202 received from the input gain block 210. Both exemplary time encoders 310, 140 may further comprise the integrator 230, configured to integrate the difference signal 206 output by the summation block 220, and the Schmidt trigger 240 or a relatively equivalent functionality. The Schmidt trigger 240 is configured to receive the integrated difference signal 208 output by the integrator 230 and to produce an output signal of the respective time encoder 310, 140. Both of the time encoders 310, 140 may further comprise the feedback gain block 250 configured to scale the respective time encoder 310, 140 output signal by a feedback scale value (e.g., GF1 and GF2, respectively) to produce the feedback signal 204 used by the summation block 220.

In some embodiments, the APP apparatus 100, 300 is configured to implement a signal reverberation based on a model of feed-forward on-center off-surround neural cellular interactions. In some of these embodiments, the first scale value is a value B and the second scale value is a value A, respectively, where the values A and B are consistent with equation (1), provided above. When considering equation (1) above, $X_i$ represents the reverberation signal 102 of the APP apparatus 100, 300 and $I_i$ represents the input signal 101, 301 of the APP apparatus 100, 300. For example, the feed-forward on-center off-surround model may be implemented with the value A equal to about 0.1 and the value B equal to about 1.0.

Figure 5:
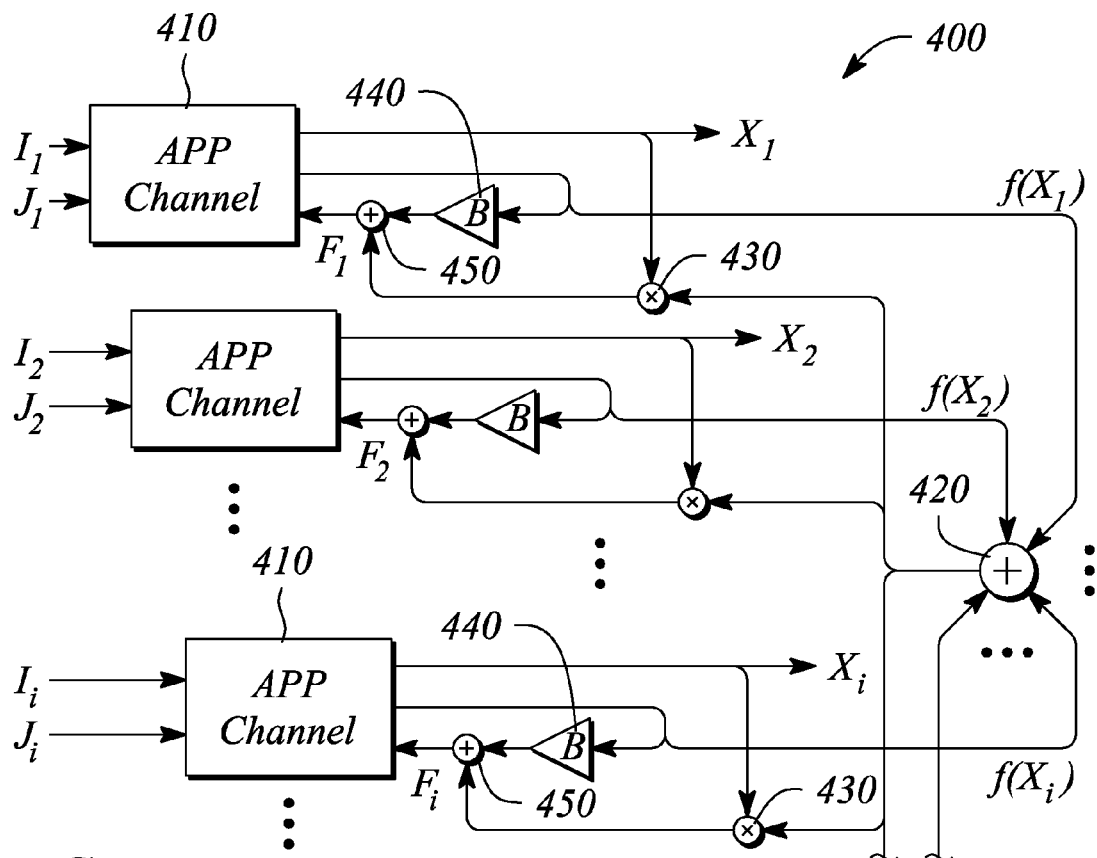
FIG. 5 illustrates a block diagram of an asynchronous pulse processing (APP) system, according to an embodiment of the present invention.

FIG. 5 illustrates a block diagram of an asynchronous pulse processing (APP) system 400, according to an embodiment of the present invention. In some embodiments, the APP system 400 comprises a plurality of one or both of the APP apparatuses 100, 300 as separate APP channels. Each of the APP apparatuses 100, 300 of the plurality of APP apparatuses is configured to receive a different signal pair of a plurality of signal pairs and to produce a channel-specific reverberation signal. Each input signal pair comprises an input signal (i.e., a channel-specific input signal $I_i$) and a reverberation inhibition signal (i.e., a channel-specific reverberation inhibition signal $J_i$).

In particular, the APP system 400 comprises a plurality of APP channels 410. Each of the APP channels 410 comprises an integrator and a first time encoder. For example, the integrator of the APP channel 410 may be substantially similar to the integrator 130 of the APP apparatus 100, 300, described above. Likewise, the first time encoder may be substantially similar to the time encoder 140 of the APP apparatus 100, 300, described above. Each of the APP channels 410 is configured to produce a channel-specific reverberation signal (e.g., $X_i$) from a channel-specific composite signal. Each of the APP channels 410 is further configured to produce a channel-specific function-modified reverberation signal (e.g., $f(X_i)$) and to receive both a channel-specific reverberation inhibition signal (e.g., $J_i$) and a channel-specific function-modified feedback signal (e.g., $F_i$).

In some embodiments, each of the APP channels 410 comprises the APP apparatus 100 and the channel-specific composite signal is substantially similar to the composite signal 104 of the APP apparatus 100. In these embodiments, each of the channel-specific input signals (i.e., $I_i$, where i ranges from 1 to n) are time-encoded input signals. In other embodiments, each of the APP channels 410 comprises the APP apparatus 300 and the channel-specific composite signal is substantially similar to the composite signal 104 of the APP apparatus 300. In these other embodiments, each of the channel-specific input signals (i.e., $I_i$, where i ranges from 1 to n) is an analog input signal.

The channel-specific composite signal comprises a channel-specific input signal $I_i$ scaled by a scale value B minus the channel-specific reverberation signal $X_i$ scaled by a scale value A (not specifically illustrated in FIG. 5), minus the channel-specific reverberation signal multiplied by a summation of the channel-specific input signal and the channel-specific reverberation inhibition signal, and plus a channel-specific feedback signal. The channel-specific feedback signal comprises a summation of function-modified channel-specific reverberation signals from each of the APP channels 410. In particular, in some embodiments, the channel-specific feedback signal comprises the function-modified channel-specific reverberation signal scaled by the scale value B minus the summation of function-modified channel-specific reverberation signals multiplied by the channel-specific reverberation signal.

In some embodiments, respective ones of the function-modified channel-specific reverberation signals comprise respective ones of the channel-specific reverberation signals modified by a sigmoid function. In some embodiments, each of the APP channels further comprises a sigmoid function block configured to produce the function-modified channel-specific reverberation signal of each of the APP channels.

In some embodiments, when the APP channels 410 comprise the APP apparatus 300, each of the APP channels 410 further comprises a second time encoder. The second time encoder (i.e., the input time encoder 310 illustrated in FIG. 4) is configured to time-encode the channel-specific input signal before the channel-specific input signal $I_i$ is scaled by the scale value B. In these embodiments, the channel-specific input signal $I_i$ may comprise an analog signal.

In some embodiments, the APP system 400 further comprises a summation block 420, as illustrated in FIG. 5. The summation block 420 is configured to produce a summation signal representing the summation of function-modified channel-specific reverberation signals from each of the APP channels 410. The summation of function-modified channel-specific reverberation signals may be substantially similar to the signal summation represented by $\Sigma f(X)$, described above with respect to the APP apparatus 100, 300. The summation block 420 may also be referred to as 'the system summation block' 420 to distinguish from other described summation blocks herein.

In some embodiments, the APP system 400 further comprises a plurality of feedback multipliers 430. An individual feedback multiplier 430 of the plurality is associated with each of the APP channels 410, as illustrated. Each of the feedback multipliers 430 is configured to accept a summation signal from the system summation block 420 and multiply the signal by the channel-specific reverberation signal $X_i$ from the associated APP channel 410. In some embodiments, the APP system 400 further comprises a plurality of feedback gain blocks 440. An individual feedback gain block 440 of the plurality is associated with each of the APP channels 410, as illustrated. Each of the feedback gain blocks 440 are configured to accept the function-modified channel-specific reverberation signal $f(X_i)$ from the associated APP channel 410 and scale the accepted signal by the scale value B.

In some embodiments, the APP system 400 further comprises a plurality of feedback summation blocks 450. An individual feedback summation block 450 of the plurality is associated with each of the APP channels 410, as illustrated. Each of the feedback summation blocks 450 is connected to an output of a respective multiplier 430 and an output of a respective feedback gain block 440 associated with the APP channel 410. Each feedback summation block 450 subtracts a signal output by the connected feedback multiplier 430 from a signal output by the connected feedback gain block 440 to produce the channel-specific feedback signal $F_i$ specific to the associated APP channel 410. The channel-specific feedback signal $F_i$ may be substantially similar to the function-modified feedback signal 108, described above with respect to the APP apparatus 100, 300, in some embodiments.

Figure 6:
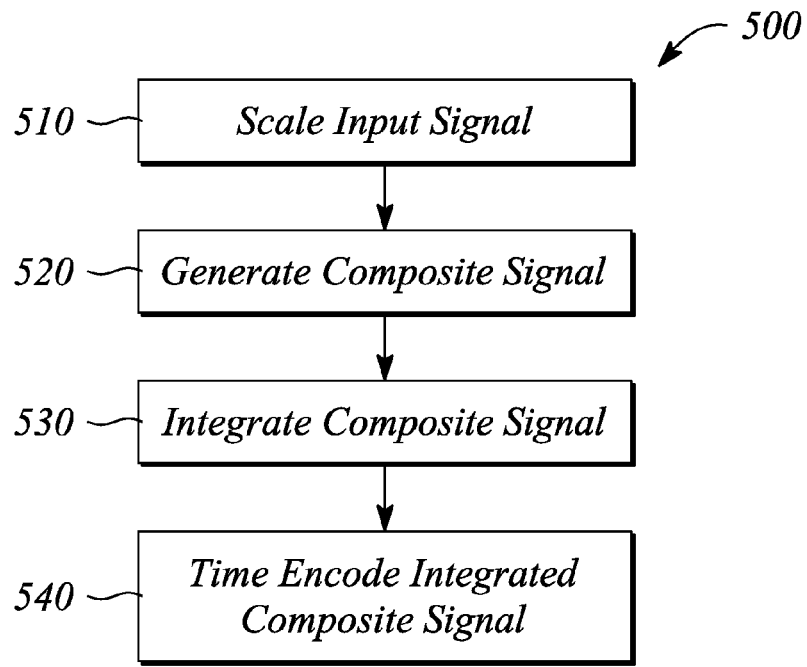
FIG. 6 illustrates a flow chart of a method of signal normalization using asynchronous pulse processing (APP), according to an embodiment of the present invention.

FIG. 6 illustrates a flow chart of a method 500 of signal reverberation using asynchronous pulse processing (APP), according to an embodiment of the present invention. The method 500 of signal reverberation comprises scaling 510 an input signal by a value B. The input signal is one of a plurality of input signals. The method 500 of signal reverberation further comprises generating 520 a composite signal. In some embodiments, generating 520 a composite signal comprises subtracting from the scaled input signal each of a reverberation signal multiplied by an input summation signal, the reverberation signal scaled by a second value A, and a function-modified feedback signal comprising a second feedback signal subtracted from a first feedback signal. The input summation signal represents the input signal summed together with a reverberation inhibition signal, in various embodiments. In some embodiments, the first feedback signal comprises a reverberation summation signal multiplied by the reverberation signal. The reverberation summation signal represents a summation of the reverberation signal modified by the function and a plurality of similarly function-modified other reverberation signals. In some embodiments, the second feedback signal comprises the reverberation signal modified by a function and scaled by the first value B.

The method 500 of signal normalization further comprises integrating 530 the composite signal. Integrating 530 produces an integrated composite signal. The method 500 of signal normalization further comprises time encoding 540 the integrated composite signal to generate the reverberation signal. In some embodiments, the values A and B are selected to implement a signal reverberation based on a model of feed-forward on-center off-surround neural cellular interactions given by equation (1) above.

In some embodiments not illustrated in FIG. 6 (e.g., see FIG. 4 instead), the method 500 of signal reverberation further comprises time encoding the input signal prior to scaling 510 the input signal by the value B. In these embodiments, the input signal may comprise an analog signal.

In some embodiments not illustrated in FIG. 6 (e.g., see FIG. 2 instead), time encoding 540 the integrated composite signal may comprise (a) scaling the integrated composite signal by a scale value GS. In some embodiments, time encoding 540 may further comprise (b) subtracting a feedback signal from the scaled integrated composite signal. The feedback signal is the normalized signal scaled by a feedback scale value GF. In some embodiments, time encoding further comprises (c) integrating a signal produced by (b) subtracting; and (d) thresholding a signal produced by (c) integrating to produce the normalized signal. In some of these embodiments, (d) thresholding is performed by a Schmidt trigger.

Thus, there have been described embodiments of an asynchronous pulse processing apparatus, an asynchronous pulse processing system and a method of signal reverberation using asynchronous pulse processing. It should be understood that the above-described embodiments are merely illustrative of some of the many specific embodiments that represent the principles of the present invention. Clearly, those skilled in the art can readily devise numerous other arrangements without departing from the scope of the present invention as defined by the following claims.

What is claimed is:

1. An asynchronous pulse processing (APP) apparatus comprising:
    an apparatus gain block configured to scale an input signal by a first scale value to produce a scaled input signal;
    an apparatus summation block configured to produce a composite signal, the composite signal representing the scaled input signal minus an input summation signal multiplied by a reverberation signal, minus the reverberation signal scaled by a second scale value, and plus a function-modified feedback signal;
    an integrator configured to integrate the composite signal and to produce an integrated composite signal; and
    a time encoder configured to time-encode the integrated composite signal and produce the reverberation signal,
    wherein the input summation signal represents the input signal summed with a reverberation inhibition signal.

2. The APP apparatus of claim 1, wherein the function-modified feedback signal comprises the reverberation signal modified by a function and scaled by the first scale value minus the reverberation signal multiplied by a summation of the function-modified reverberation signal and a plurality of function-modified reverberation signals of other APP apparatuses.

3. The APP apparatus of claim 2, further comprising a sigmoid block connected to an output of the time encoder, wherein a function of the function-modified feedback signal comprises a sigmoid function, and wherein the sigmoid block accepts the reverberation signal and produces the function-modified reverberation signal.

4. The APP apparatus of claim 3, further comprising an apparatus feedback gain block configured to receive the function-modified reverberation signal and provide to the apparatus summation block the function-modified reverberation signal scaled by the second scale value.

5. The APP apparatus of claim 1, wherein the time encoder (TE) comprises:
    a TE input gain block configured to scale the integrated composite signal by a scale value and produce a scaled integrated signal;
    a TE summation block configured to subtract a TE feedback signal from the scaled integrated signal;
    a TE integrator configured to integrate a signal output by the TE summation block;
    a Schmidt trigger configured to receive the signal output by the TE integrator and produce the reverberation signal; and
    a TE feedback gain block configured to scale the reverberation signal by a feedback scale value and produce the TE feedback signal used by the TE summation block.

6. The APP apparatus of claim 1, further comprising another time encoder configured to time-encode the input signal before the input signal is received by the apparatus gain block, the input signal comprising an analog signal.

7. The APP apparatus of claim 6, wherein both of the time encoders comprise:
    a TE input gain block configured to scale a signal at an input of the respective time encoder by a scale value;
    a TE summation block configured to subtract a TE feedback signal from a signal received from the TE input gain block;
    a TE integrator configured to integrate a signal output by the TE summation block;
    a Schmidt trigger configured to receive a signal output by the TE integrator and produce an output signal of the respective time encoder; and
    a TE feedback gain block configured to scale the respective time encoder output signal by a feedback scale value to produce the TE feedback signal used by the TE summation block,
    wherein respective ones of the scale values of the TE input gain blocks and the TE feedback gain blocks of each of the apparatus time encoder and the other time encoder are independent of one another.

8. The APP apparatus of claim 1, further comprising a multiplier configured to receive the input summation signal and the reverberation signal and provide the reverberation signal multiplied by the input summation signal to the apparatus summation block.

9. The APP apparatus of claim 1, wherein the first scale value is a value B and the second scale value is a value A, the values A and B being selected to implement a signal reverberation based on a model of feed-forward on-center off-surround neural cellular interactions given by $$\frac{dX_i}{dt} = -AX_i + (B - X_i)[f(X_i) + I_i] - X_i\left(\sum_{k \neq i} f(X_k) + J_i\right)$$

where $X_i$ represents the reverberation signal, $I_i$ represents the input signal of the APP apparatus, $J_i$ represents the reverberation inhibition signal, $X_k$ represents reverberation signals of a plurality of other APP apparatuses indexed on an integer k, k being not equal to i, and $f(\bullet)$ is a function that modifies respective reverberation signals $X_i$ and $X_k$.

10. The APP apparatus of claim 9, wherein the value A is about 0.1 and the value B is about 1.0.

11. An APP system that employs the APP apparatus of claim 1, the APP system comprising a plurality of the APP apparatuses as APP channels, each of the APP apparatuses of the plurality of APP apparatuses being configured to receive a different one of a plurality of input signals as a channel-specific input signal and a different one of a plurality of reverberation inhibition signals as a channel-specific reverberation inhibition signal and being further configured to produce a channel-specific reverberation signal, wherein the function-modified feedback signal comprises the channel-specific reverberation signal modified by a function and scaled by the first value minus the channel-specific reverberation signal multiplied by a summation of the function-modified reverberation signal and a plurality of function-modified reverberation signals of other ones of the APP apparatuses.

12. An asynchronous pulse processing (APP) system comprising:
a plurality of APP channels, each of the APP channels comprising an integrator and a first time encoder (TE) and being configured to receive a channel-specific input signal and a channel-specific reverberation inhibition signal and being configured to produce a channel-specific reverberation signal from a channel-specific composite signal, the channel specific composite signal comprising the channel-specific input signal scaled by a first scale value minus the channel-specific reverberation signal multiplied by a summation of the channel-specific input signal and the channel-specific reverberation inhibition signal, minus the channel-specific reverberation signal scaled by a second scale value, and plus a channel-specific feedback signal,
wherein the channel-specific feedback signal comprises a summation of function-modified channel-specific reverberation signals from each of the APP channels.

13. The APP system of claim 12, wherein for each of the APP channels, the channel-specific feedback signal further comprises the function-modified channel-specific reverberation signal scaled by the first scale value minus the summation of function-modified channel-specific reverberation signals multiplied by the channel-specific reverberation signal.

14. The APP system of claim 12, wherein the first time encoder of each of the APP channels comprises:
a TE input gain block configured to scale an output signal of the integrator by a third scale value and produce a scaled integrated signal;
a TE summation block configured to subtract a feedback signal from the scaled integrated signal;
a TE integrator configured to integrate a signal output by the TE summation block;
a Schmidt trigger configured to receive a signal output by the TE integrator and produce the channel-specific reverberation signal; and
a TE feedback gain block configured to scale the channel-specific reverberation signal by a feedback scale value and produce the feedback signal used by the TE summation block.

15. The APP system of claim 12, wherein a APP channel further comprises a second time encoder (TE), the second time encoder being configured to time-encode the channel-specific input signal before the channel-specific input signal is scaled by the first scale value, the channel-specific input signal comprising an analog signal.

16. The APP system of claim 15, wherein both of the first time encoder and the second time encoder of the APP channel independently comprise:

a TE input gain block configured to scale a signal at an input of the respective time encoder by an input scale value;
a TE summation block configured to subtract a feedback signal from a signal received from the TE input gain block;
a TE integrator configured to integrate a signal output by the TE summation block;
a Schmidt trigger configured to receive a signal output by the TE integrator and produce an output signal of the respective time encoder; and
a TE feedback gain block configured to scale the respective time encoder output signal by a feedback scale value to produce the feedback signal used by the TE summation block,
wherein respective ones of the scale values of the TE input gain blocks and the TE feedback gain blocks of each of the first time encoder and the second time encoder are independent of one another.

17. The App system of claim 16, wherein the input scale value and the feedback scale value of the first time encoder are about 1800 and 1200, respectively, and wherein the input scale value and the feedback scale value of the second time encoder are both about 1000.

18. The APP system of claim 12, wherein respective ones of the function-modified channel-specific reverberation signals comprise respective ones of the channel-specific reverberation signals modified by a sigmoid function, and wherein each of the APP channels further comprises a sigmoid function block configured to produce the function-modified channel-specific reverberation signal of each of the APP channels.

19. A method of signal reverberation using asynchronous pulse processing (APP), the method comprising:
scaling an input signal by a first scale value, the input signal being one of a plurality of input signals;
generating a composite signal;
integrating the composite signal to produce an integrated composite signal; and
time encoding the integrated composite signal to generate a reverberation signal,
wherein generating the composite signal comprises subtracting from the scaled input signal each of a reverberation signal multiplied by an input summation signal, the reverberation signal scaled by a second scale value, and a function-modified feedback signal comprising a second feedback signal subtracted from a first feedback signal,
wherein the input summation signal represents the input signal summed together with a reverberation inhibition signal.

20. The method of signal reverberation of claim 19, wherein the first feedback signal comprises a reverberation summation signal multiplied by the reverberation signal, the reverberation summation signal representing a summation of the reverberation signal modified by a function and a plurality of similarly function-modified other reverberation signals, and wherein the second feedback signal comprises the reverberation signal modified by the function and scaled by the first scale value.

* * * * *